United States Patent [19]
Weiss

[11] Patent Number: 5,252,831
[45] Date of Patent: Oct. 12, 1993

[54] REDIRECTING LIGHT FROM A FLUORESCENT COATING BY A MIRROR LAYER

[75] Inventor: Armin K. Weiss, Rochester, N.Y.
[73] Assignee: Eastman Kodak Company, Rochester, N.Y.
[21] Appl. No.: 787,275
[22] Filed: Nov. 4, 1991
[51] Int. Cl.$^5$ ............................................. G01J 5/20
[52] U.S. Cl. .............................. 250/370.11; 250/372
[58] Field of Search ........................ 250/370.11, 372; 359/589

[56] References Cited

U.S. PATENT DOCUMENTS

| | | | |
|---|---|---|---|
| 3,996,461 | 12/1976 | Sulzbach et al. | 357/29 |
| 4,096,387 | 6/1978 | Buckley | 250/372 |
| 4,262,206 | 4/1981 | Viehmann | 250/368 X |
| 4,605,849 | 8/1986 | Kliem et al. | 250/216 |
| 4,747,666 | 5/1988 | Ishida | 359/589 X |
| 4,793,669 | 12/1988 | Perilloux | 359/589 X |
| 5,059,800 | 10/1991 | Cueman et al. | 250/370.11 X |
| 5,099,359 | 3/1992 | Hrycin et al. | 359/589 X |

OTHER PUBLICATIONS

Stuart et al., "Instrumentation in Astronomy IV", SPIE, vol. 331, 1982, pp. 52–68.
Viehmann et al., "Ultraviolet and Vacuum Ultraviolet Systems", SPIE, vol. 279, 1981, pp. 146–152.
Curtis et al., "Fabrication of Mosaic Color Filters by Dry-Etching Dielectric Stacks", J. Vac. Sci. Technol., A4(1), 1986, pp. 70–74.

Primary Examiner—Constantine Hannaher
Assistant Examiner—Edward J. Glick
Attorney, Agent, or Firm—Raymond L. Owens

[57] ABSTRACT

A spectrally selective mirror layer positioned over a fluorescent coating over a semiconductor light detector support effectively redirects toward the light detector support that fraction of fluorescent light which would escape from the fluorescent coating in the absence of the spectrally selective mirror.

4 Claims, 3 Drawing Sheets

REDIRECTING LIGHT FROM A FLUORESCENT COATING BY A MIRROR LAYER

FIELD OF THE INVENTION

The present invention relates to redirecting light emitted from a fluorescent coating by a spectrally selective mirror layer.

BACKGROUND OF THE INVENTION

Fluorescent coatings comprising fluorescent compounds dispersed or dissolved in polymeric film-forming materials have been reported as radiation converters or radiation converting light concentrators. In U.S. Pat. No. 4,262,206 by W. Viehmann is disclosed a fluorescent radiation converter, comprising a more or less uniform coating on a substantially transparent support of a polymeric material containing a fluorescent compound.

Other applications of unpatterned fluorescent coatings relate to their use in conjunction with solid-state radiation-sensing elements, such as silicon-based photovoltaic sensors or charge-coupled devices (CCD). Here, the unpatterned fluorescent, polymeric coating is applied more or less uniformly on an individual device for the purpose of extending the responsivity of the device to a spectral region or wavelength range where the native, uncoated device has little or no response to incident radiation.

Such applications of unpatterned, fluorescent polymeric coatings over radiation-sensitive elements are disclosed in: U.S. Pat. No. 4,605,489 by P. O. Kliem; W. Viehmann, et al, SPIE Vol. 279, "Ultraviolet and Vacuum Ultraviolet Systems", pages 146-152 (1981); F. E. Stuart, et al, SPIE Vol. 331, "Instrumentation in Astronomy IV", pages 52-68 (1982), and references contained therein.

The discovery of forming fluorescent patterns on a support by photolithographic patterning of a fluorescent coating is described in U.S. patent application No. 716,462 filed Jun. 17, 1991 in the name of A. K. Weiss entitled "Photolithographically Patterned Fluorescent Coating". A photolithographically patternable polymeric organic composition, frequently referred to as a "photoresist", has incorporated in its liquid precursor state organic fluorescent compounds, such fluorescent compounds being selected from the group consisting of: coumarin fluorescent compounds, polynuclear fluorescent compounds, pyran fluorescent compounds and rhodamine fluorescent compounds.

Spectrally selective mirrors, also referred to as dielectric mirrors or as dichroic mirrors are well known. The term "dichroic", meaning "two-colored", will be used henceforth to most appropriately describe the optical performance of such mirrors: they transmit light of at least one spectral region or color and they act as a mirror or reflector of light of at least one second spectral region or color.

Such mirrors are composed of multiple, alternating sub-layers of at least two, intrinsically transparent, materials, one material having a higher optical index of refraction than the other material. Depending on the desired qualities of spectral transmittance and spectral reflectance of the finished dichroic element, the number of alternating sub-layers can be in a range of from about 5 to about 40.

The alternating sub-layers of the materials can be, for example, silicon dioxide ($SiO_2$) with an optical index of refraction of about 1.45, and titanium dioxide ($TiO_2$) with an optical index of refraction of about 2.3. The sub-layers can be deposited on a support, and onto one another, by vapor phase techniques like evaporation or sputtering, or by spin coating liquid precursor compounds such as alkoxides of silicon and titanium, with subsequent heat treatment to affect conversion into the respective oxides. Another method to fabricate a dichroic mirror is to select as the higher optical index of refraction material either titanium dioxide or zinc sulfide, and to deposit either of these materials by vapor phase techniques. The lower optical index of refraction material can be a polymeric organic composition with an optical index of refraction of about 1.5, a value typical of many organic compositions. Such polymeric organic layers can be formed, for example, by spin coating a liquid precursor onto a previously deposited higher optical index of refraction layer. Alternating sub-layers of a polymeric organic composition may aid in reducing the buildup of stresses frequently observed when both, the higher and lower optical index of refraction materials are inorganic compounds.

Dichroic mirror layers can be unpatterned, i.e. covering the entire support substantially uniformly, or they can be patterned on the support. Patterning can be accomplished by several methods: vapor phase deposition through a patterned mask, located in close proximity to the support, between the support and the vapor sources; patternwise etching of a previously uniformly deposited dichroic mirror layer by selectively and completely removing portions of the mirror coating; and by so-called lift-off methods whereby a uniform mirror coating is applied to a support having a predeposited patterned material which, when subsequently subjected to liquids or their vapors, swells and dissolves and thereby lifts off overlying portions of the previously uniform dichroic mirror coating.

Unpatterned dichroic elements referred to as multilayer interference filters, multilayer optical filters or optical thin film filters are disclosed in U.S. Pat. No. 3,996,461 by Sulzbach et al, in U.S. Pat. No. 4,747,666 by Ishida, and in U.S. Pat. No. 4,793,669 by Perilloux.

Forming unpatterned dichroic filters on a support by spin-coating alternate layers from liquid precursors is disclosed in U.S. patent application No. 794,687 filed Nov. 18, 1991 which is a divisional of U.S. patent application Ser. No. 609,567 filed Nov. 5, 1990 by Melpolder et al entitled "Forming Sol-Gel Dichroic Color Filters", now abandoned.

Patterned dichroic filter elements are described by B. J. Curtis et al, J. Vac. Sci. Technol. A, Vol. 4(1), pages 70-74 (1986) and references contained therein.

SUMMARY OF THE INVENTION

In accordance with this invention, it has been discovered that fluorescent light emanating from within a fluorescent coating on a support can be effectively redirected by a spectrally selective mirror layer.

It is an object of the present invention to effectively redirect toward the support that fraction of light emanating from a fluorescent coating on a support which would otherwise be lost.

A further object of this invention is to redirect such fluorescent light by means of a dichroic mirror being transmissive to light within a first spectral region and being reflective to the fluorescent light comprising a second spectral region.

A further object of this invention is to enhance the sensitivity of a semiconductor light detector with an integral fluorescent coating by overlaying on at least portions of this coating a dichroic mirror to redirect fluorescent light which would otherwise not reach the light detector.

A still further object of this invention is to select the transmissive spectral region of the dichroic mirror layer such that this first spectral region is located within at least a portion of the spectral region over which the fluorescent coating can be stimulated to emit light in a second spectral region.

These objects of the present invention are achieved in a method of making an efficient semiconductor light detector having a fluorescent coating which absorbs light primarily in a first spectral region and emits light primarily in a second spectral region, comprising the steps of:

(a) providing a fluorescent coating over a semiconductor light detector substrate, such light detector being substantially more responsive to light in the second spectral region than to light in the first spectral region; and (b) positioning a dichroic mirror layer over at least a partial area of the fluorescent coating, such dichroic mirror layer substantially transmitting light in the first spectral region and substantially reflecting light in the second spectral region.

An advantage of this invention is that the dichroic mirror layer redirects toward the light detector support a substantial fraction of light emitted by the fluorescent coating in the direction away from the light detector, thus enhancing the amount of light received by the detector.

Another advantage of this invention is that the transmissive spectral region of the dichroic mirror layer can serve as one color filter in an array of color filters when the use of color filter arrays is contemplated.

A further advantage of this invention is that a dichroic mirror layer, being composed of relatively hard, glass-like, abrasion resistant inorganic oxides, can provide protection against abrasion of the underlying, relatively soft organic polymeric fluorescent coating.

It has been discovered that the sensitivity of a semiconductor light detector with an integral fluorescent coating can be enhanced significantly by an overlying dichroic mirror whose reflective spectral region redirects toward the light detector that fraction of fluorescent light in a second spectral region which would escape from the fluorescent coating in the absence of the dichroic mirror, and whose transmissive spectral region allows for substantially unimpeded transfer of light in a first spectral region to the fluorescent coating so as to stimulate the fluorescent coating to emit light in the second spectral region.

BRIEF DESCRIPTION OF THE DRAWINGS

The present invention can be better appreciated by reference to the following preferred embodiments considered in conjunction with the drawings, in which.

MODES OF CARRYING OUT THE INVENTION

Figure 1:
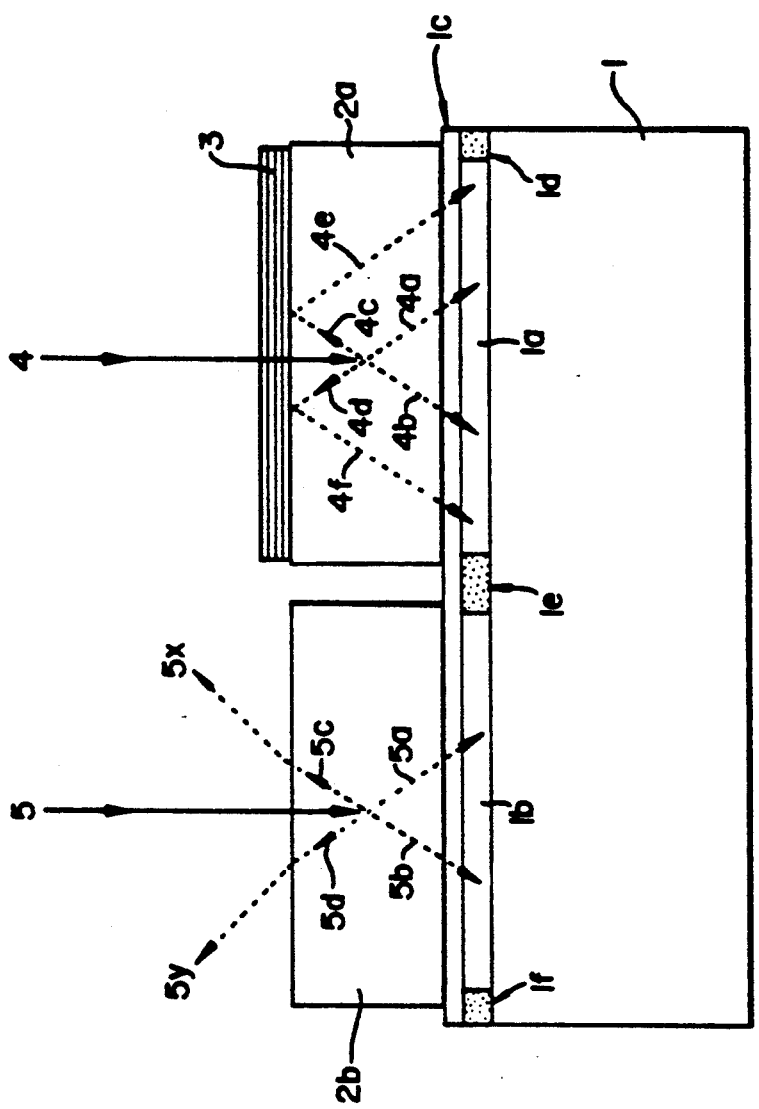
FIG. 1 is a schematic cross-sectional view of a semiconductor light detector with two light sensitive domains and with a patterned fluorescent coating with a dichroic mirror layer covering one of the fluorescent patterns.

In FIG. 1 a semiconductor light detector 1 is shown with two light sensitive domains 1a and 1b located slightly below the detector surface 1c. Domains 1a and 1b are laterally optically isolated from each other by opaque separator 1e, and adjacent light sensitive domains (not shown) are optically isolated by opaque separators 1d and 1f, respectively. Patterned fluorescent coating 2a is depicted overlying photosensitive domain 1a, and identical, patterned fluorescent coating 2b is overlying photosensitive domain 1b.

Dichroic mirror layer 3 is positioned over fluorescent coating 2a. Incident light beams 4 and 5 are identical in spectral quality and intensity; they have been designated with different numerals only to permit tracing of their respective fluorescence derivatives 4a-f and 5a-d, 5x,y. Incident light 4 and 5 is in a first spectral region, including a wavelength range of from about 300 nm to about 500 nm, preferably from about 350 nm to about 480 nm. Referring now to incident beam 4, it is transmitted substantially unimpeded to fluorescent coating 2a by the transmissive spectral region of dichroic mirror layer 3. Incident beam 4 is shown to partially penetrate fluorescent coating 2a, which is partially absorptive in this first spectral region. Fluorescent light emission in a second spectral region is stimulated by light beam 4 in coating 2a, as indicated by dotted lines 4a, 4b, 4c and 4d. This second spectral region comprises a wavelength range of from about 525 nm to about 750 nm, preferably from about 550 nm to about 700 nm. Fluorescent beams 4a and 4b are shown being directed toward the light sensitive domain 1a, while fluorescent beams 4c and 4d are directed toward the dichroic mirror layer 3, which is substantially reflective in the preferred second spectral region containing the fluorescent light. Thus, fluorescent beam 4c is redirected by dichroic mirror layer 3 toward light sensitive domain 1a as beam 4e, and fluorescent beam 4d is likewise redirected as beam 4f. The effect of dichroic mirror layer 3 on light sensitive domain 1a is that four beams 4a, 4b, 4e and 4f are directed at domain 1a, thereby providing a certain level of illumination and related electrical signal (not shown).

Referring now to incident beam 5, it is shown to partially penetrate fluorescent coating 2b, which is partially absorptive in this first spectral region. Fluorescent light emission in a second spectral region is stimulated by light beam 5 in coating 2b, as indicated by dotted lines 5a, 5b, 5c and 5d. Fluorescent beams 5a and 5b are shown being directed toward the light sensitive domain 1b, while fluorescent beams 5c and 5d are directed toward the free surface of fluorescent coating 2b, where beam 5c leaves coating 2b as beam 5x, and beam 5d leaves as beam 5y. Beams 5x and 5y are shown slightly refracted with respect to 5c and 5d, the refraction being due to a change in the index of refraction from about 1.5 in coating 2b to about 1.0 in the air above coating 2b. Light sensitive domain 1b receives only fluorescent beams 5a and 5b, because fluorescent beams 5c and 5d are lost as beams 5x and 5y in the absence of the dichroic mirror layer 3.

Figure 2:
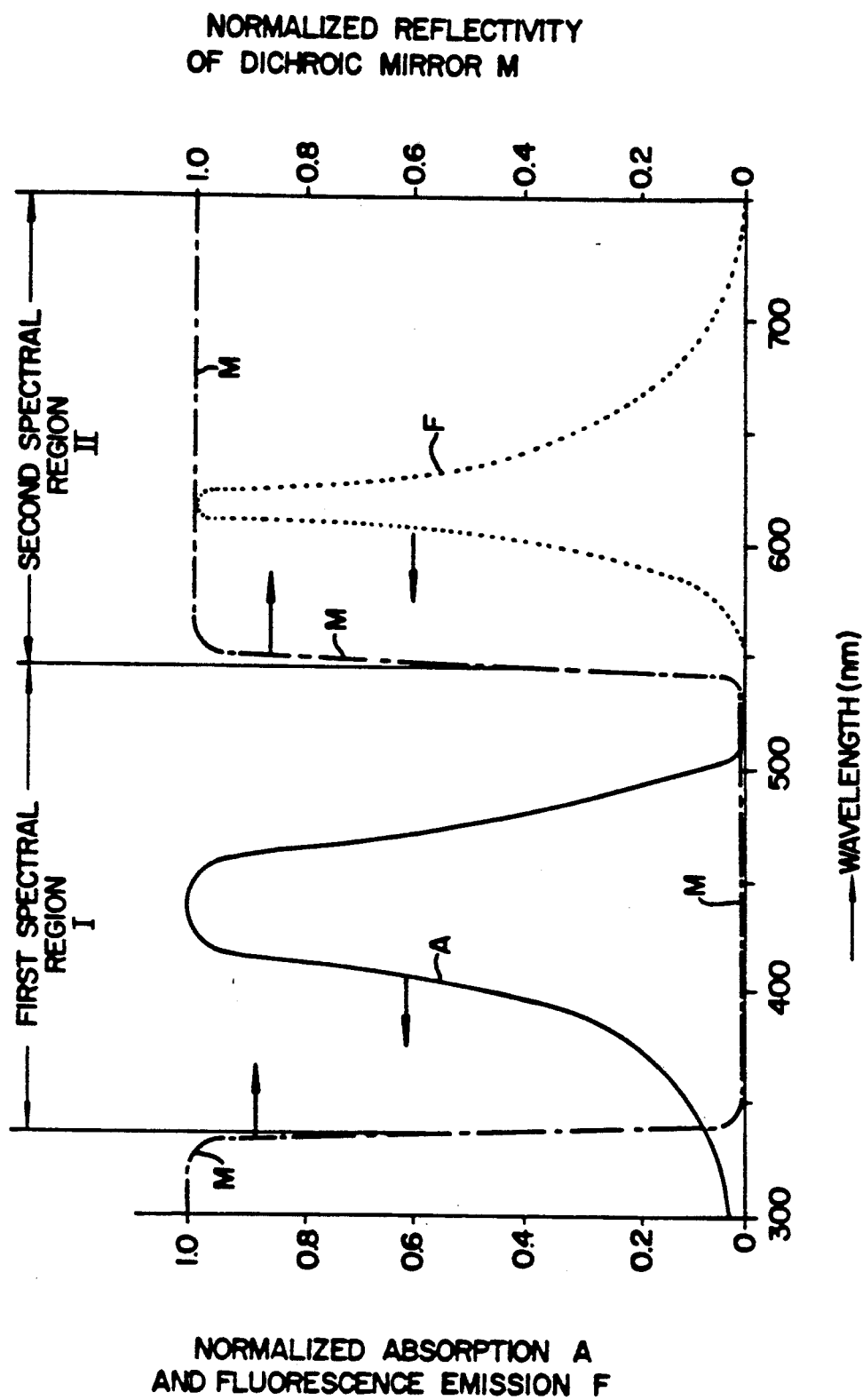
FIG. 2 is a schematic diagram showing the spectral regions of the transmissive and reflective behavior of a dichroic mirror layer in conjunction with the spectral regions of stimulation and emission of the underlying fluorescent coating.

In FIG. 2 the first spectral region I comprises a region in which dichroic mirror M is substantially transmissive, that is having substantially no reflectivity. Within the first spectral region I is located a major portion of the absorption band A of the fluorescent coatings 2a and 2b in FIG. 1. When directing incident light within the first spectral region I at the fluorescent coating, the coating's absorption A of that incident light stimulates the coating to emit light which is substantially contained in a second spectral region II, shown as a dotted trace F in FIG. 2. In spectral region II, the dichroic mirror M is substantially reflective as indicated by the normalized reflectivity value of 1.0. Thus, the dichroic mirror M will reflect, and thereby redirect, substantially all light within spectral region II, while being substantially transmissive to all light within spectral region I. By selecting the number and thicknesses of the alternating sub-layers comprising dichroic mirror M, the spectral range of both, spectral region I and spectral region II, can be selected to permit desired absorption of a spectral portion of incident light (shown as 4 in FIG. 1) and desired redirecting of emitted fluorescent light (4c to 4e and 4d to 4f in FIG. 1) by the dichroic mirror M (shown as 3 in FIG. 1).

Figure 3:
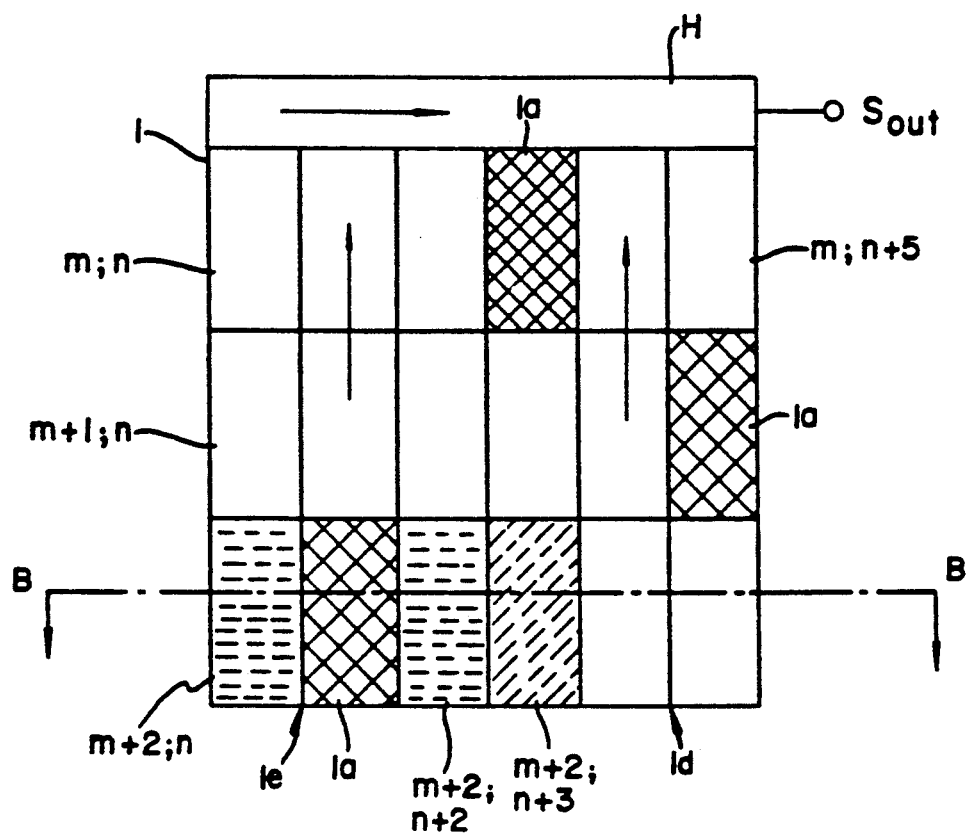
FIG. 3 is a plan view of a semiconductor light detector comprising a plurality of light sensitive domains and associated read-out means for electrical signals corresponding to light incident on the light sensitive domains.

In FIG. 3 is shown a plan view of a semiconductor light detector 1 comprising a plurality of light sensitive domains and associated read-out means for electrical signals corresponding to light incident on the light sensitive domains. These domains are arranged orthogonally into vertical columns and horizontal rows, designated generally as m;n, m+1;n, m+2; n+2, etc. Three such domains are, however, designed as 1a to correspond to designations used in FIG. 1. The read-out of electrical signals is indicated by arrows, proceeding along the vertical columns and along a horizontal shift register H to a signal output terminal $S_{OUT}$. Opaque separators 1d and 1e between light sensitive domains are designated as in FIG. 1.

The cross-hatched light sensitive domains 1a are designated domains having a patterned fluorescent coating with an overlying dichroic mirror layer positioned on them.

Light sensitive domain m+2, n+3 indicates by its slanted dashed lines an organic dye red color filter positioned directly on the surface of the light sensitive domain. Domains m+2; n and m+2; n+2 depict by horizontal dashed lines an organic dye green color filter positioned directly on the surface of the respective light sensitive domains.

Figure 4:
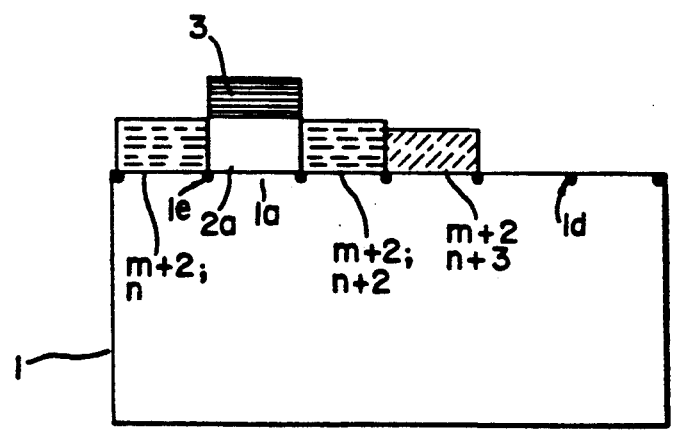
FIG. 4 is a cross-sectional view of several light sensitive domains of a semiconductor light detector, with some of these domains having a fluorescent coating and a dichroic mirror layer overlaid on the fluorescent coating, and with some other light sensitive domains having organic dye color filter elements.

The line B—B serves to indicate the direction along which the semiconductor light detector 1 will be fractured for cross-sectional viewing in FIG. 4.

In FIG. 4 is given the cross-sectional view along the line B—B in FIG. 3. Semiconductor light detector 1 has light sensitive domains 1a and m+2;n, m+2; n+2 and m+2; n+3, and opaque separators 1d and 1e.

Light sensitive domain 1a has a patterned fluorescent coating 2a on it. Dichroic mirror layer 3 is positioned over the fluorescent coating 2a. Dichroic mirror layer 3 is transmissive in a first spectral region from about 380 nm to about 500 nm, comprising violet-blue light. Layer 3 is reflective in a second spectral region from about 510 nm to about 750 nm, comprising green and red light. Fluorescent coating 2a absorbs blue light and emits, by fluorescence, primarily red light within the second spectral region.

Light sensitive domains m+2; n and m+2; n+2 have, over their respective surfaces, an organic dye green color filter, being transmissive to green light in the spectral region from about 510 nm to about 580 nm, and being substantially absorptive to blue light and to red light.

Light sensitive domain m+2; n+3 has over its surface an organic dye red color filter which is transmissive to red light in the spectral region from about 590 nm to about 750 nm, and which is substantially absorptive to blue light and to green light.

Thus, the semiconductor light detector has designated light sensitive domains, responsive to light of different colors, such as red light, green light and blue light, while providing enhanced sensitivity to blue light by the performance of the fluorescent coating in conjunction with the overlying dichroic mirror layer.

EXAMPLE 1

A liquid fluorescent composition was prepared by adding the following fluorescent compounds to 50 grams of a 11% solution of polydimethylglutarimide in cyclopentanone and diethylene glycol monomethyl ether solvents:

0.275 gram of 7-diethylamino-4-methylcoumarin, also referred to as coumarin 1;

0.275 gram of 2,3,6,7-tetrahydro-1,1,7,7-tetramethyl 11-oxo-1H, 5H, 11H-(1) benzopyrano (5,7,8-ij) quinolizine-10-carboxylic acid ethyl ester, also referred to as coumarin 314 T;

0.0688 gram of 3-(2'-benzothiazolyl)-7-diethylaminocoumarin, also referred to as coumarin 6; and 0.0165 gram of a tetramethyl-substituted rhodamine, also referred to as a tetramethyl-substituted rhodamine 101 inner salt.

The designations of the fluorescent compounds referred to above are designations used by Eastman Kodak Company in Catalog No. 54 of Laboratory Chemicals (1990) or in Catalog No. JJ-169 of Optical Products (1990).

A wafer shaped semi-conductor light detector support was placed on a rotatable platen of a spin-coating apparatus in such a manner that the above liquid fluorescent composition could be applied to the support surface containing the light detector with a plurality of light sensitive domains, and with associated registration features. After spin coating the liquid fluorescent composition at 1500 rpm for about 5 seconds, the fluorescent coating and support were baked at 200° C. for 60 seconds on a hot plate.

A quartz mask, comprising suitably positioned opaque and transmissive areas and registration features, was registratively oriented to registration features on the semiconductor support. The fluorescent coating was registratively exposed through the transmissive areas of the mask to radiation from a mercury vapor lamp, providing radiation in the wavelength range of from about 220 nm to about 350 nm. The patternwise exposed coating was patternwise developed by immersion into a tetramethylammonium-based aqueous developer for 4 minutes, followed by a water rinse and spin-drying at 4000 rpm for 30 seconds. Previously patternwise exposed areas of the fluorescent coating were removed from the semiconductor support by the development step, leaving fluorescent areas registratively overlaid on those light sensitive domains of the semiconductor support which corresponded to opaque areas of the mask.

A quartz wafer support was similarly coated with the above fluorescent composition and baked at 200° C. for 60 seconds. This fluorescent coating was not exposed, nor was it developed. The fluorescent coating on the quartz support served as a control for measuring the absorptive properties of the fluorescent coating in a spectrophotometer (PERKIN-ELMER, Model LAMBDA-7): the fluorescent coating had an absorbance value greater than 1.0 over a first spectral region of from about 350 nm to about 460 nm. Upon illuminating the fluorescent coating to light within that first spectral region, the coating was stimulated to emit light by fluorescence in a second spectral region, such light appearing red to the unaided eye.

A dichroic mirror layer comprising 30 successive alternating sub-layers of titanium dioxide and silicon dioxide on a glass support had a substantially transmissive first spectral region in the wavelength range of from about 365 nm to about 495 nm, referred to as near ultraviolet-blue light. The mirror layer had a substantially reflective second spectral region in the wavelength range of from about 510 nm to about 750 nm, comprising green and red light.

The dichroic mirror side was positioned over selected, adjacent light sensitive domains of the semiconductor light detector, such selected domains each having an overlying fluorescent coating.

Thus was obtained a semiconductor light detector, having a plurality of light sensitive domains, such domains being classified by three groupings of adjacent domains:

| Group 1 | domains are bare domains, i.e. domains without fluorescent coating and without dichroic mirror layer; |
| Group 2 | domains are domains covered by the fluorescent coating, but without the dichroic mirror layer; and |
| Group 3 | domains are domains covered by the fluorescent coating and by the overlying dichroic mirror layer. |

The performance of each of the three groups of photosensitive domains was determined by illuminating each group with monochromatic light of a wavelength of 400 nm, i.e. light within a first spectral region as indicated schematically in FIG. 2, and measuring the corresponding signal level at the signal output terminal $S_{OUT}$ of the semiconductor light detector (see FIG. 3). The results are tabulated below, with the signal level of Group 1 photosensitive domains being represented as a normalized value of 1.0.

| Group 1 domains | signal = 1.0 |
| Group 2 domains | signal = 8.89 |
| Group 3 domains | signal = 12.8 |

These results demonstrate the effectiveness of the dichroic mirror overlay on the fluorescent coating in redirecting toward the Group 3 photosensitive domains that fraction of the fluorescent the same fluorescent coating over the Group 2 photosensitive domains.

EXAMPLE 2

The procedures of Example 1 were repeated, except that the liquid fluorescent composition of example 1 was modified by deleting the fluorescent compound 7-diethylamino-4-methylcoumarin.

A control coating on a quartz wafer support had an absorbance value greater than 1.0 over a first spectral region of from about 450 nm to about 460 nm. Upon illuminating the fluorescent coating to light within that first spectral region, the coating was stimulated to emit light by fluorescence in a second spectral region, such light appearing red to the unaided eye.

A semiconductor light detector, having a plurality of light sensitive domains was prepared as in Example 1, resulting in three groupings of adjacent domains as in Example 1. The performance of each of the three groups of photosensitive domains was determined as in Example 1, using monochromatic light of a wavelength of 400 nm, i.e. light within the first spectral region.

The results are tabulated below, with the signal level of Group 1 photosensitive domains being represented as a normalized value of 1.0.

| Group 1 domains | signal = 1.0 |
| Group 2 domains | signal = 9.16 |
| Group 3 domains | signal = 11.46 |

These results demonstrate the effectiveness of the dichroic mirror overlay on the fluorescent coating in redirecting toward the Group 3 photosensitive domains that fraction of the fluorescent light in the second spectral region which escaped from the same fluorescent coating over the Group 2 photosensitive domains.

The invention has been described in detail with particular reference to certain preferred embodiments thereof, but it will be understood that variations and modifications can be effected within the spirit and scope of the invention.

I claim:

1. In a semiconductor light detector which is substantially more responsive to light in the green-red spectral region of from about 510 nm to about 750 nm than to light in the ultraviolet-blue spectral region of from about 300 nm to about 500 nm, the improvement comprising:
   (a) a semiconductor light detector substrate;
   (b) a plurality of light sensitive domains formed in the semiconductor light detector substrate;
   (c) a fluorescent coating photolithographically patterned registratively over selected light sensitive domains while other domains are not covered by the fluorescent coating; and
   (d) a dichroic mirror layer positioned over said selected light sensitive domains having said patterned fluorescent coating thereon, said dichroic mirror layer substantially transmitting light in the ultraviolet-blue spectral region and reflecting light in the green-red spectral region.

2. The semiconductor light detector of claim 1, wherein the registratively patterned fluorescent coating absorbs light primarily in the spectral region of from about 300 nm to about 500 nm, and emits light primarily in the spectral region of from about 525 m to about 750 nm.

3. The semiconductor light detector of claim 2, wherein the dichroic mirror layer positioned over the fluorescent coating is substantially transmissive to light within a spectral region which at least partly overlaps the spectral region of absorption of the fluorescent coating; and is substantially reflective to light within a spectral region of absorption of the fluorescent coating; and is substantially reflective to light within a spectral region which at least partly overlaps the spectral region of light emission of the fluorescent coating.

4. The semiconductor light detector of claim 1 further including a patterned dye green-transmitting color filter array registratively positioned over light sensitive domains not covered by the fluorescent coating and which are adjacent to light sensitive domains covered by the fluorescent coating and the dichroic mirror layer.

* * * * *